United States Patent
Grigorian et al.

(10) Patent No.: US 8,059,208 B2
(45) Date of Patent: Nov. 15, 2011

(54) LINE TAPPING METHOD OF VIDEO AMPLIFICATION FOR UNSHIELDED TWISTED PAIR ACTIVE RECEIVER

(75) Inventors: Samuel N. Grigorian, Fresno, CA (US); Yogita S. Karkhanis, Fresno, CA (US); Sourikhan K. Kopanhnha, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 628 days.

(21) Appl. No.: 12/239,481

(22) Filed: Sep. 26, 2008

(65) Prior Publication Data

US 2010/0083340 A1 Apr. 1, 2010

(51) Int. Cl.
*H04N 17/02* (2006.01)
(52) U.S. Cl. ...................................................... 348/707
(58) Field of Classification Search .......... 348/705–707, 348/606–607, 609, 611, 614, 618, 723, 725, 348/143, 552; 725/148–149; 330/84, 85, 330/106, 274, 310
See application file for complete search history.

(56) References Cited

U.S. PATENT DOCUMENTS

| | | | |
|---|---|---|---|
| 5,546,136 A | 8/1996 | Nakamoto et al. | |
| 6,137,524 A | 10/2000 | Chea | |
| 6,184,919 B1* | 2/2001 | Asprey et al. | 725/148 |
| 6,408,008 B1 | 6/2002 | Komarek et al. | |
| 6,446,263 B1 | 9/2002 | Crosby | |
| 6,480,241 B1 | 11/2002 | Boccaccio | |
| 6,744,376 B1* | 6/2004 | Pascalidis | 340/870.21 |
| 7,047,556 B2* | 5/2006 | Cole et al. | 725/149 |
| 7,110,229 B2 | 9/2006 | Yang et al. | |
| 7,286,871 B2* | 10/2007 | Cohen | 600/544 |
| 7,760,272 B2* | 7/2010 | Miller | 348/723 |
| 7,796,194 B2* | 9/2010 | Hall | 348/558 |
| 7,808,557 B2* | 10/2010 | Hall | 348/607 |
| 2003/0034963 A1 | 2/2003 | Moon et al. | |
| 2006/0182171 A1* | 8/2006 | Kuijk et al. | 375/229 |
| 2006/0268167 A1 | 11/2006 | Cole et al. | |
| 2007/0052849 A1 | 3/2007 | Craddock et al. | |
| 2007/0094699 A1 | 4/2007 | Chen | |
| 2007/0263713 A1 | 11/2007 | Aronson | |
| 2007/0300284 A1 | 12/2007 | Hall et al. | |
| 2008/0049104 A1 | 2/2008 | Chang | |
| 2009/0196098 A1* | 8/2009 | Kohler et al. | 365/185.03 |

OTHER PUBLICATIONS

Intersil Americas, Inc.; "Sync Separator; 50% slice, S-H, Filter"; Data Sheet for EL4581; Feb. 8, 2008; 10 pages; (No. FN7172.1).
Maxim Intergrated Products, Inc.; "Adaptive Equalizer for Video Over Twisted Pair"; Data Sheet for MAX7474; Jan. 2008; 10 pages; (No. 19-3216; Rev0; 1/08).

(Continued)

*Primary Examiner* — Paulos Natnael
(74) *Attorney, Agent, or Firm* — Paul T. Kashimba, Esq.

(57) ABSTRACT

Embodiments of the present invention include systems, methods and apparatus for amplifying a composite video signal transmitted over long distance unshielded twisted pair cabling. The apparatus and system may include a plurality of amplifiers, an analog switch, and a control unit. The control unit generates a configuration signal to enable the output of one or more amplifiers (which may be serially connected) and configure the analog switch. A user input may be provided for manually configuring the amplifiers and analog switch. When the video signal is a color signal, the control unit may automatically configure the amplifiers and analog switch with reference to the amplitude of the color burst.

27 Claims, 10 Drawing Sheets

OTHER PUBLICATIONS

Pelco, Inc.; "Active Video Transmission over Unshielded Twisted Pair"; Data Sheet for CM9700UTP Series Video Receivers; Jan. 2007; 2 pages; (No. C2618 / New 1-07).

Pelco, Inc.; "Multichannel Active Receivers"; Installation manual for Sixteen and Thirty-Two Channels for UTP Transmission; Jan. 2008; 24 pages; (No. C2618M-A 1/08).

* cited by examiner

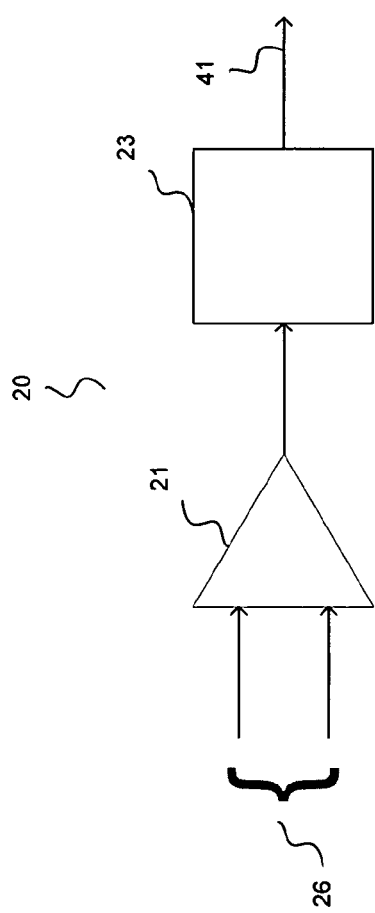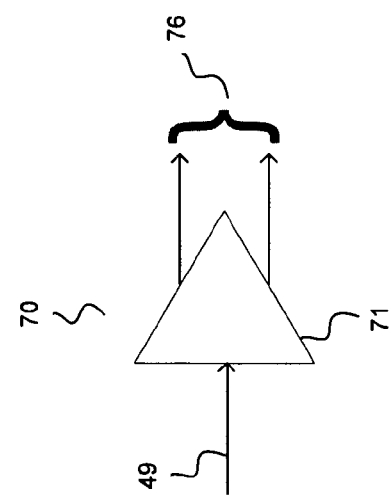

LINE TAPPING METHOD OF VIDEO AMPLIFICATION FOR UNSHIELDED TWISTED PAIR ACTIVE RECEIVER

BACKGROUND OF THE INVENTION

1. Field of the Invention

The present invention relates to video signal receivers. More specifically, embodiments of the present invention relate to methods, apparatuses, and systems for amplifying a video signal which has been transmitted over an unshielded twisted pair.

2. Description of the Prior Art

The use of surveillance cameras and related systems is becoming increasingly more prevalent. Not only are surveillance cameras used in such traditional institutions as banks and casinos, but their use has spread to retail and business establishments, indoor and outdoor entry points, airport security checkpoints, government buildings, parking lots, and the like. In most installations, it is desirable to receive images from one or more surveillance cameras in a centralized monitoring location. Depending on the installation, this centralized monitoring location may be several hundred to several thousand meters from any given individual surveillance camera. Although coaxial cable can be used as a transmission line in smaller installations, it is cost prohibitive in the majority of large installations. In these installations, the transmission line between the surveillance camera and the centralized monitoring location typically is an unshielded twisted pair (UTP). The cost of a UTP transmission line is significantly less than the cost of coaxial cable, which is due in part to the pervasive use of UTP in telephonic and computer networking systems (e.g., CAT 5/5e cables include a number of unshielded twisted pairs). In addition, UTP also has good common mode noise rejection capabilities. However, and as is common with most other types of transmission lines, a signal becomes increasingly attenuated with increasing transmission line lengths. Such attenuation must be considered in designing UTP receivers.

For long UTP transmission lines, conventional receivers employ equalizers and/or amplifiers to compensate for losses. Referring to FIG. 1, a UTP transmission line 5 may be connected on one end to a camera (not shown). At the other end, the UTP transmission line 5 can be received by a UTP receiver. The UTP receiver can include an electrostatic discharge suppression (ESD) circuit 10, and adaptive equalizer 80, and a video driver 90. The ESD circuit 10 serves to dissipate static electricity at the point the UTP transmission line is coupled to the receiver so as to prevent overvoltage and/or overcurrent damage to the receiver. Additionally, the ESD circuit 10 can include a termination circuit for load line matching. The output 95 of the video driver 90 can be coupled to a digital or analog monitor or recording device such as a video cassette recorder, digital video disk recorder, or digital video recorder.

An exemplary graph for a black-and-white composite video signal includes both high and low frequency components, as shown in FIG. 2A. A color composite video signal, as shown in the exemplary graph of FIG. 2B, also includes a color burst portion which can be seen as the high frequency portion of the signal on the left hand side of the graph. The color burst has a location within the ideal composite video waveform defined as 0.6 uS after the sync tip portion. It is further defined as a 3.58 MHz sinusoidal signal for 2.5 uS. As shown in the examples of FIGS. 2A and 2B, the portion immediately following the sync tip (the "back porch") has a DC offset of about 300 mV (or 40 IRE) above the sync tip. The color burst is located in a section of the back porch. Ideally, the peak-to-peak amplitude of the color burst would be the same as the sync portion, or about 300 mV.

As shown in FIG. 3, attenuation in a typical UTP transmission line (and as shown, specifically Cat 5, 25-pair cable) increases logarithmically as a function of both frequency and distance. It is seen that for a given frequency, for example 10 MHz, the attenuation at 50 meters is about 2 dB whereas the attenuation at 300 meters is about 20 dB. It can also be seen that for a given transmission line length, for example 300 meters, the attenuation at 10 MHz is about 20 dB whereas the attenuation at 100 MHz is about 65 dB.

FIG. 4A is an exemplary representation of a composite video signal sweep (from zero to 6 MHz) that has been transmitted on a 300 meter UTP transmission line. It can be seen that in this example the higher frequency components of the signal (which are seen later in the time domain) are more attenuated than the lower frequency components (which are seen earlier in the time domain). FIGS. 4B, 4C, and 4D represent the same exemplary composite video signal transmitted on 600, 900, and 1200 meter UTP transmission lines, respectively. After 1200 meters, it can be seen in the example that both high and low frequency components of the composite video signal have been significantly attenuated.

Some conventional methods of compensating for UTP transmission line loss associated with the length of the transmission line include amplifying the signal received from the UTP transmission line by a gain approximately equal to the attenuation. For example, if the transmission line loss is 48 dB, conventional receiving methods would include amplifying the received signal with a gain of about 48 dB. While the line loss over a particular transmission medium can be approximated (for example, UTP line loss may be approximated as 12 dB per 300 meters at 4 MHz), it should be remembered that the quality of the transmission medium, the existence and quality of cabling connections, the proximity to sources of electromagnetic interference, and other factors may cause the actual line loss to be higher or lower than the approximated value. As such, conventional methods in which the compensating gain directly correlates only to the length of the transmission line may be inferior to other conventional methods which calculate the precise compensation by measuring the actual attenuation of the signal.

Some conventional adaptive equalizers, such as the MAXIM® MAX7474 (Trademark owned by Maxim Integrated Products, Inc.), are capable of compensating for transmission line losses of color composite signals by monitoring the sync pulse amplitude (for low frequency losses) and the color burst amplitude (for high frequency losses). However, conventional adaptive equalizers have a finite limit to the amount of compensation which can be provided. For example, the MAXIM® MAX7474 can compensate for losses on transmission line lengths of up to 600 meters by providing a high frequency gain of up to 12 dB and a low frequency gain of up to 3.6 dB. It has not been believed possible for single chip conventional adaptive equalizers to compensate for losses at sufficiently long transmission line lengths due to the number of internal digital operations which increases the overall signal to noise ratio. Thus, conventional adaptive equalizers are not suitable for use in UTP receivers where the distance between the UTP receiver and the camera (e.g., the transmission line length) is sufficiently long, for example, greater than 600 meters.

Other conventional technology includes the use of one or more amplifiers to provide a gain to the attenuated video signal prior to being received by the video drivers and/or conventional adaptive equalizers. In one example, the feedback characteristics of one or more amplifiers may be adjusted until the desired gain is achieved. For example, the feedback of any given amplifier stage may be configured so as to produce a fixed gain. When there are minimal transmission line losses (for example, when the line is less than 300 meters long), the feedback of each of the amplifier stages may be changed such that they each produce a unitary gain. However, such conventional technology unnecessarily wastes power and contributes unnecessary signal noise when any given amplifier stage is enabled but not producing a gain.

It is therefore desirable to provide methods, apparatuses, and systems which can be implemented in UTP receivers that are capable of providing substantial gain to compensate for transmission line losses resulting from long UTP line lengths while at the same time not wasting power or contributing noise when the UTP line has a short length.

SUMMARY OF THE INVENTION

Embodiments of the present invention provide systems, methods and apparatus for amplifying a video signal which has been transmitted over an unshielded twisted pair.

In one aspect, embodiments of the invention concern an apparatus for amplifying a video signal that can include: a plurality of amplifiers each configured to receive at least one configuration signal, wherein a first of the plurality of amplifiers is further configured to receive the video signal; an analog switch configured to (i) receive the video signal, a signal from each of the plurality of amplifiers, and the at least one configuration signal and (ii) generate an amplified video signal; and a control unit configured to (i) receive the amplified video signal and (ii) generate the at least one configuration signal, wherein the plurality of amplifiers are configured to be enabled in response to the at least one configuration signal and the analog switch is configured in response to the at least one configuration signal.

In another aspect, embodiments of the invention concern an apparatus for amplifying a video signal that can include: a pre-processing circuit configured to receive a signal from a differential transmission line and generate the video signal, the pre-processing circuit comprising a preamplifier and a DC restore circuit; a plurality of amplifiers configured in series, each configured to receive at least one configuration signal, wherein a first of the plurality of amplifiers is further configured to receive the video signal; an analog switch configured to (i) receive the video signal, a signal from each of the plurality of amplifiers, and the at least one configuration signal and (ii) generate an amplified video signal; at least one user mode control signal received from the group consisting of a switch, a button, a potentiometer, and a jumper; a control unit comprising a sync separator and configured to (i) receive the amplified video signal and the at least one user mode control signal and (ii) generate the at least one configuration signal in response to the amplitude of a color burst portion of the amplified video signal and the at least one user mode control signal, wherein the plurality of amplifiers are configured to be enabled in response to the at least one configuration signal and the analog switch is configured in response to the at least one configuration signal; and a post-processing circuit configured to receive the amplified video signal and generate a differential amplified video signal, the post-processing circuit comprising a differential amplifier.

In other embodiments, the invention concerns a system for receiving a composite video signal from an unshielded twisted pair transmission line that can include: a port configured to receive a signal from the unshielded twisted pair transmission line, the port comprising a terminal, an electrostatic discharge protection circuit, and a load line balancing circuit; a pre-processing circuit configured to receive a signal from the port, the pre-processing circuit comprising a preamplifier and a DC restore circuit; a plurality of amplifiers each configured to receive at least one configuration signal, wherein a first of the plurality of amplifiers is further configured to receive a signal from the pre-processing circuit; an analog switch configured to receive (i) a signal from the pre-processing circuit, (ii) a signal from each of the plurality of amplifiers, and (iii) the at least one configuration signal; a control unit configured to (i) receive a signal from the analog switch and (ii) generate the at least one configuration signal, wherein the plurality of amplifiers are configured to be enabled in response to the at least one configuration signal and the analog switch is configured in response to the at least one configuration signal; a post-processing circuit configured to receive a signal from the analog switch, the post-processing circuit comprising a differential amplifier; a video processing circuit configured to receive a signal from the post-processing circuit; and a video driver circuit configured to receive a signal from the video processing circuit and generate at least one signal capable of being received by one of the group consisting of an analog video recorder, a digital video recorder, an analog monitor, and a digital monitor.

In another aspect, embodiments of the invention concern a method of equalizing a composite video signal that can include: causing the video signal to be received by an analog switch and a first of a plurality of N serially connected amplifiers; causing an output signal from each of the plurality of amplifiers to be received by the analog switch; causing an amplified video signal of the analog switch to be received by a control unit; causing a configuration signal from the control unit to be received by (i) the analog switch and (ii) each of the plurality of amplifiers, the configuration signal having at least N+1 states; and adjusting the state of the configuration signal in response to an amplitude of the amplified video signal.

These and other objects, advantages, and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIGS. 8A and 8B are block diagrams of a pre-processing circuit and a post-processing circuit, respectively, each in accordance with embodiments of the present invention.

DETAILED DESCRIPTION

The invention, in its various aspects, will be explained in greater detail below with regard to preferred embodiments. While the invention will be described in conjunction with the preferred embodiments, the preferred embodiments themselves do not limit the scope of the invention. Rather the invention, as defined by the claims, may cover alternatives, modifications, and/or equivalents of the preferred embodiments. Similarly, the accompanying drawings do not limit the scope of the preferred embodiments and/or the invention, but rather, are illustrative of one or more examples of the preferred embodiments and/or invention.

Figure 5:
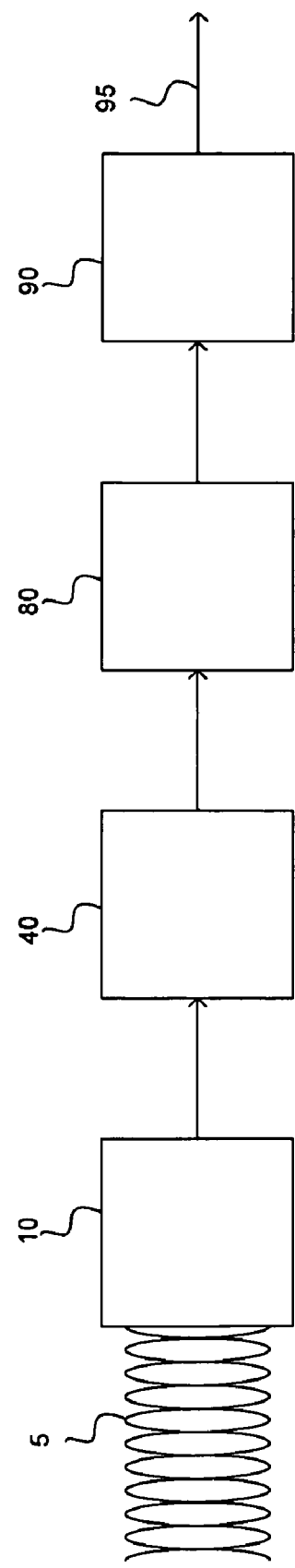
FIG. 5 is a block diagram of a UTP receiver in accordance with embodiments of the present invention.

Referring to the drawings, wherein like reference characters designate like or corresponding parts throughout the several views, and specifically to FIG. 5, embodiments of the present invention can include an electrostatic discharge suppression (ESD) circuit 10, a video amplification circuit 40, and a video driver 90. In some implementations, the video amplification circuit 40 can be used alone. In other implementations, and as shown, the video amplification circuit 40 can be used in conjunction with an adaptive equalizer circuit 80.

An Exemplary Apparatus for Amplifying a Video Signal

In some embodiment, an apparatus for amplifying a video signal can include: a plurality of amplifiers each configured to receive at least one configuration signal, wherein a first of the plurality of amplifiers is further configured to receive the video signal; an analog switch configured to (i) receive the video signal, a signal from each of the plurality of amplifiers, and the at least one configuration signal and (ii) generate an amplified video signal; and a control unit configured to (i) receive the amplified video signal and (ii) generate the at least one configuration signal, wherein the plurality of amplifiers are configured to be enabled in response to the at least one configuration signal and the analog switch is configured in response to the at least one configuration signal.

Figure 6:
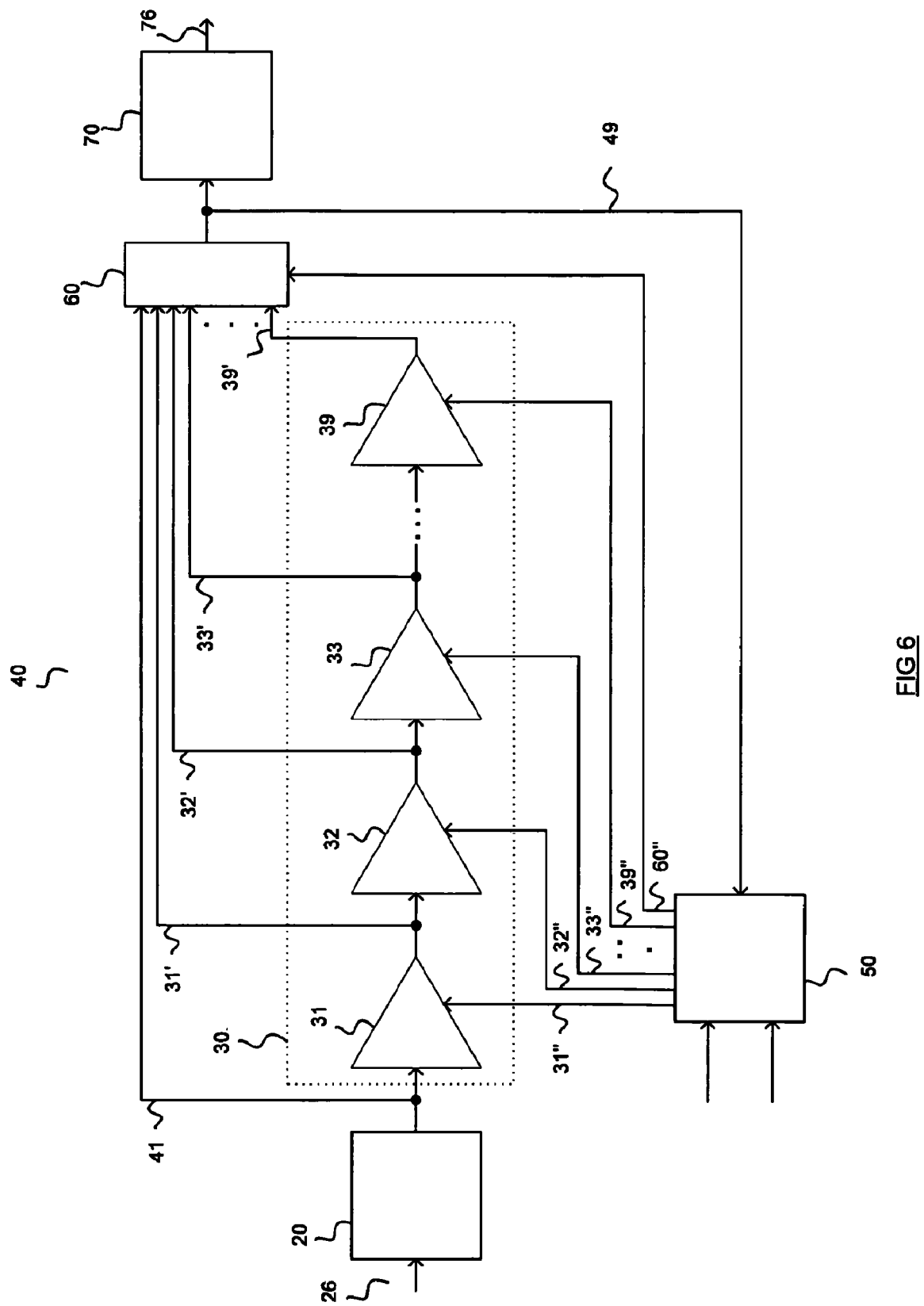
FIG. 6 is a block diagram of a video amplification circuit in accordance with embodiments of the present invention.

Referring to the exemplary embodiment of FIG. 6, a video amplifying circuit 40 can include a plurality of amplifiers 30 (comprising amplifiers 31, 32, 33, and 39), a control unit 50, and an analog switch 60. Each of amplifiers 31, 32, 33, and 39 may comprise a single operational amplifier or may comprise one or more operational amplifiers, transistor amplifiers, and the like. In some embodiments, each of plurality of amplifiers 30 may be frequency compensating amplifiers configured with frequency selective feedback. In some examples, the frequency selective feedback may be implemented by passive electronic components, such as resistors, capacitors, inductors, and the like, and combinations thereof.

A first amplifier (for example, amplifier 31) can be configured to receive a video signal 41. Output signals 31', 32', 33', and 39' of amplifiers 31, 32, 33, and 39, respectively, can be received by analog switch 60 (so called "line tapping" of each of the amplifier outputs). It is to be understood that there can be any number of amplifiers included in a plurality of amplifiers 30, as indicated by the ellipsis between amplifiers 33 and 39. For example, a plurality of amplifiers 30 may include three amplifiers. In another example, a plurality of amplifiers 30 may include twenty three amplifiers. In one implementation, and as shown in the example of FIG. 6, a plurality of amplifiers 30 can be configured in series such that each amplifier excepting the first is configured to receive, as input, an output from the immediately proceeding amplifier.

Figure 7A:
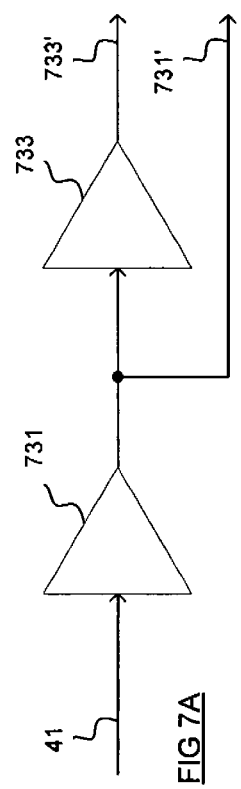
FIGS. 7A through 7C are block diagrams depicting various configurations of amplifiers in accordance with embodiments of the present invention.
Figure 7B:
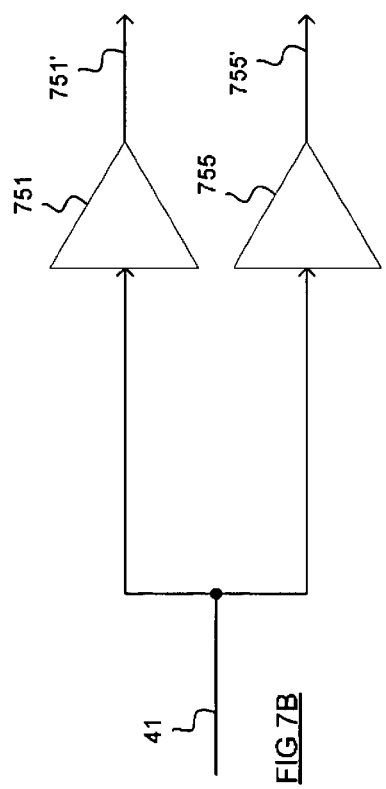
Figure 7C:
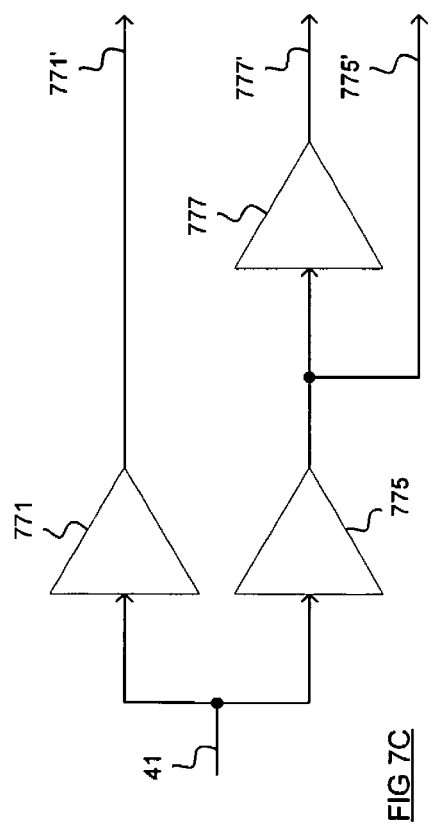

However, in other implementations, a plurality of amplifiers 30 can be configured in parallel, or, some in series and some in parallel. Referring to the exemplary embodiment of FIG. 7A, the amplifiers may be configured in series such that the first amplifier (for example, amplifier 731) receives video signal 41 as input, a second amplifier 733 receives output signal 731' as an input signal, and so on. Output signals 731' and 733' of amplifiers 731 and 733, respectively, can each be provided to an analog switch (not shown). FIG. 7B illustrates an exemplary embodiment where a plurality of amplifiers can have a parallel topology. A first amplifier 751 can receive, as can a second amplifier 755, the video signal 41 as input. Output signals 751' and 755' of amplifiers 751 and 755, respectively, may each be provided to an analog switch. Moreover, and as shown in the example of FIG. 7C, amplifiers 771 and 775 may be configured in parallel and amplifiers 775 and 777 may be configured in series. Similar to FIGS. 7A and 7B, a first amplifier 771 and amplifier 775 can receive video signal 41. Output signals 771', 775', and 777' of amplifiers 771, 775, and 777, respectively, may each be provided to an analog switch. The topology of the plurality of amplifiers may be chosen with respect to the desired gain to be achieved, as will be discussed in more detail below. It should be clear however that regardless of the topology of the plurality of amplifiers, at least a first amplifier is configured to receive a video signal. In addition, an output signal from each of the plurality of amplifiers is provided to an analog switch.

Referring back to the exemplary embodiment of FIG. 6, a plurality of amplifiers 30 may be configured to receive at least one configuration signal from control unit 50. For example, each of amplifiers 31, 32, 33, and 39 can be configured to receive at least one configuration signal 31", 32", 33", and 39", which are generated by control unit 50. Each of the configuration signals may be a single bit or multibit digital signal and functions to enable or disable the output of the respective amplifier. Thus, power consumption can be reduced because each of plurality of amplifiers 30 can be disabled on an individual basis, as discussed below. As shown in the example, configuration signal 31" is specific to and received only by amplifier 31, configuration signal 32" is specific to and received only by amplifier 32, and so on. However, in other implementations, control unit 60 may be configured to generate a single configuration signal that is received by each amplifier. For example, the single configuration signal may comprise an $I^2C$ (or inter-integrated circuit) bus or similar shared bus addressing scheme. In such cases, each of configuration signals 31", 32", 33", and 39", as shown not only in FIG. 6 but the rest of the drawings, may correspond to a logical control signal.

Analog switch 60 may be configured to receive an output signal from each of plurality of amplifiers 30 (e.g., output signals 31', 32', 33', and 34'). Analog switch 60 may also be configured to receive the video signal 41 and a configuration signal 60". Configuration signal 60", as above, may be a single bit or multibit digital signal and may be dedicated to analog switch 60 or shared amongst analog switch 60 and plurality of amplifiers 30. Corresponding to the state of configuration signal 60", analog switch 60 can be configured to generate an amplified video signal 49 reflective of either video signal 41 or an output signal of one of plurality of amplifiers 30 (e.g., signals 31', 32', 33', or 39'). Moreover, and in the exemplary embodiment where plurality of amplifiers 30 are serially connected, amplified video signal 49 can be reflective of an output signal of the last enabled amplifier.

For example, and without limitation, depending on the desired gain, the output of amplifier 31 may be enabled by a configuration signal 31", an output of amplifier 32 may be enabled by a configuration signal 32", and outputs of the remaining amplifiers (e.g., amplifiers 33 and 39) may be disabled by the other signals (e.g., configuration signals 33" and 39"). Because in this example amplifier 32 is the last enabled amplifier, configuration signal 60" may be selected so as to cause analog switch 60 to generate an amplified video signal 49 reflective of output signal 32' of amplifier 32. In other examples, if no gain is desired, the configuration signals may be chosen such that an output of each of the plurality of amplifiers 30 is disabled and analog switch 60 is configured to generate amplified video signal 49 reflective of video signal 41. In other examples, and corresponding to FIGS. 6 and 7C, an output of amplifier 775 may be enabled and outputs of amplifiers 771 and 777 may be disabled (via configuration signals). Analog switch 60 can be configured to generate amplified video signal 49 reflective of output signal 775' of amplifier 771.

Referring back now to FIG. 6, in some embodiments, video amplifying circuit 40 can include a pre-processing circuit 20 configured to receive a signal 26 from a differential transmission line and generate video signal 41. In other embodiments, circuit 40 can include a post-processing circuit 70 configured to receive amplified video signal 49 and generate a differential amplified video signal 76. As shown in the exemplary embodiment of FIG. 8A, pre-processing circuit 20 may include a pre-amplifier 21 configured to receive a differential mode video signal 26 from ESD circuitry 10 (as shown in FIG. 5) and provide a signal to a DC restore circuit 23. DC restore circuit 23 can be configured to reduce any DC bias present in the signal from pre-amplifier 21. As shown in the example of FIG. 8B, post-processing circuit 70 may include a differential amplifier 71 configured to receive amplified video signal 49 from analog switch 60 (as shown in FIG. 6) and provide a differential amplified video signal 76. The purpose of including pre-processing circuit 20 and post-processing circuit 70 are to reduce the implementation complexity of plurality of amplifiers 30, analog switch 60, and control unit 50 (as shown in FIG. 6). Composite video is normally transmitted over UTP in differential mode. Referring back to FIG. 6, in applications where pre-processing circuitry 20 and post processing circuitry 70 is not included, each of the plurality of amplifiers 30 and analog switch 60 must be configured to operate in differential mode (not shown). By converting differential mode video signal 26 to a single ended mode video signal 40, the cost of (and power consumed by) the plurality of amplifiers 30 and analog switch 60 can be reduced.

In some embodiments, each of plurality of amplifiers 30 may have a response characteristic about equal to each other. By way of example, and without limitation, consider a UTP receiver suitable for receiving composite video over a maximum UTP transmission line length of 900 meters. It is known that a UTP transmission line length of 900 meters may correspond to signal attenuation of about 36 dB at 4 MHz. Thus in some examples, a video amplifying circuit 40 can be configured to have three amplifiers (e.g., amplifiers 31, 32, and 33), each amplifier configured with a gain of 12 dB at 4 MHz. In other examples, a video amplifying circuit 40 can be configured to have four amplifiers, each amplifier configured with a gain of 9 dB at 4 MHz. As thus configured, the exemplary video amplifying circuit 40 can fully compensate for transmission line lengths of up to 900 meters.

In some implementations, the gain of each amplifier may be fixed by setting a feedback loop with fixed discrete components (such as resistors and capacitors). In other implementations, the gain of each amplifier may be programmably controlled by external logic or control unit 50.

Because video signal 41 and an output signal of each of the serially connected plurality of amplifiers 30 can be received (or "tapped out") by an analog switch 60, systems can be designed to provide either no compensation (e.g., when the output of all amplifiers are disabled and analog switch 60 is configured to pass video signal 41), full compensation (e.g., when the output of all amplifiers are enabled and the analog switch 60 is configured to pass the output signal 39' of amplifier 39), or partial compensation.

For example, and with reference to the exemplary serially connected amplifiers of FIG. 6, if the outputs of amplifiers 31 and 32 are the only outputs enabled, and analog switch 60 is configured to pass signal 32', the gain will be equal to the gain of amplifier 31 plus the gain of amplifier 32. It is to be appreciated that the maximum gain of video amplifying circuit 40 is defined by the sum of the gains from each of the plurality of amplifiers 30. Referring back to the example of FIG. 7B, it can be seen that the maximum gain of a plurality of parallel configured amplifiers is defined by the maximum gain of either amplifier 751 or 755. And as can be seen with reference to FIG. 7C, the maximum gain of a plurality of amplifiers, some configured in parallel and some configured in series, is defined by the maximum gain of each parallel branch (e.g., the maximum of either (i) the gain of amplifier 771 or (ii) the gain of amplifier 775 plus the gain of amplifier 777).

In some implementations, video amplification circuit 40 may be configured to compensate for transmission line losses resulting in attenuation A and plurality of amplifiers 30 is configured to amplify video signal 41 with a gain of at least G. Attenuation A represents a theoretical attenuation due to the transmission of a composite video signal over a UTP transmission line. In a further implementation, gain G can be about equal to attenuation A. For example, consider the characteristic UTP transmission line having a theoretical attenuation of 12 dB per every 300 meters at 4 MHz. In some implementations, a receiver can be configured to compensate for transmission line losses corresponding to a length of 1200 meters (a theoretical attenuation A of about 48 dB). Thus, to fully compensate for the losses over this exemplary distance, plurality of amplifiers 30 must be configured to provide at least a 48 dB gain at 4 MHz.

Figure 1:
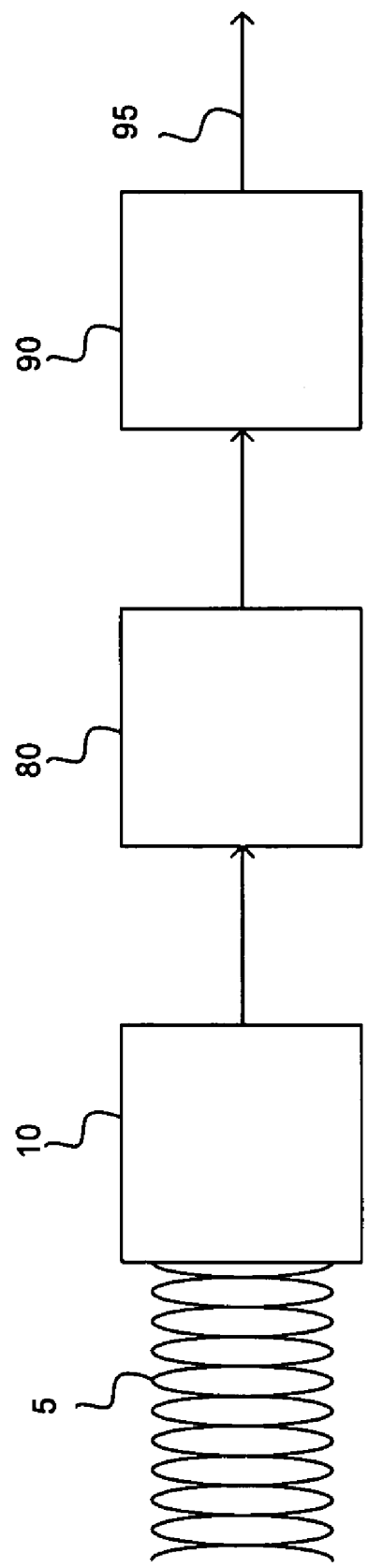
FIG. 1 is a block diagram of a conventional UTP receiver.

In the conventional circuit of FIG. 1, an adaptive equalizer 80 can be configured to receive a video signal and compensate for attenuation line loss over a UTP transmission line length of up to, for example, 600 meters. So limited, adaptive equalizer 80 will not alone be able to compensate for attenuation line loss over a UTP transmission line length of up to, for example, 1800 meters. Therefore, it is another object of the present invention to provide additional apparatuses and methods for adapting the conventional receiver circuit as shown in FIG. 1 to compensate for long length transmission lines (longer than the adaptive equalizer alone can compensate). As shown in FIG. 5, a system in accordance with other embodiments of the present invention can further include an adaptive equalizer circuit 80.

Figure 10:
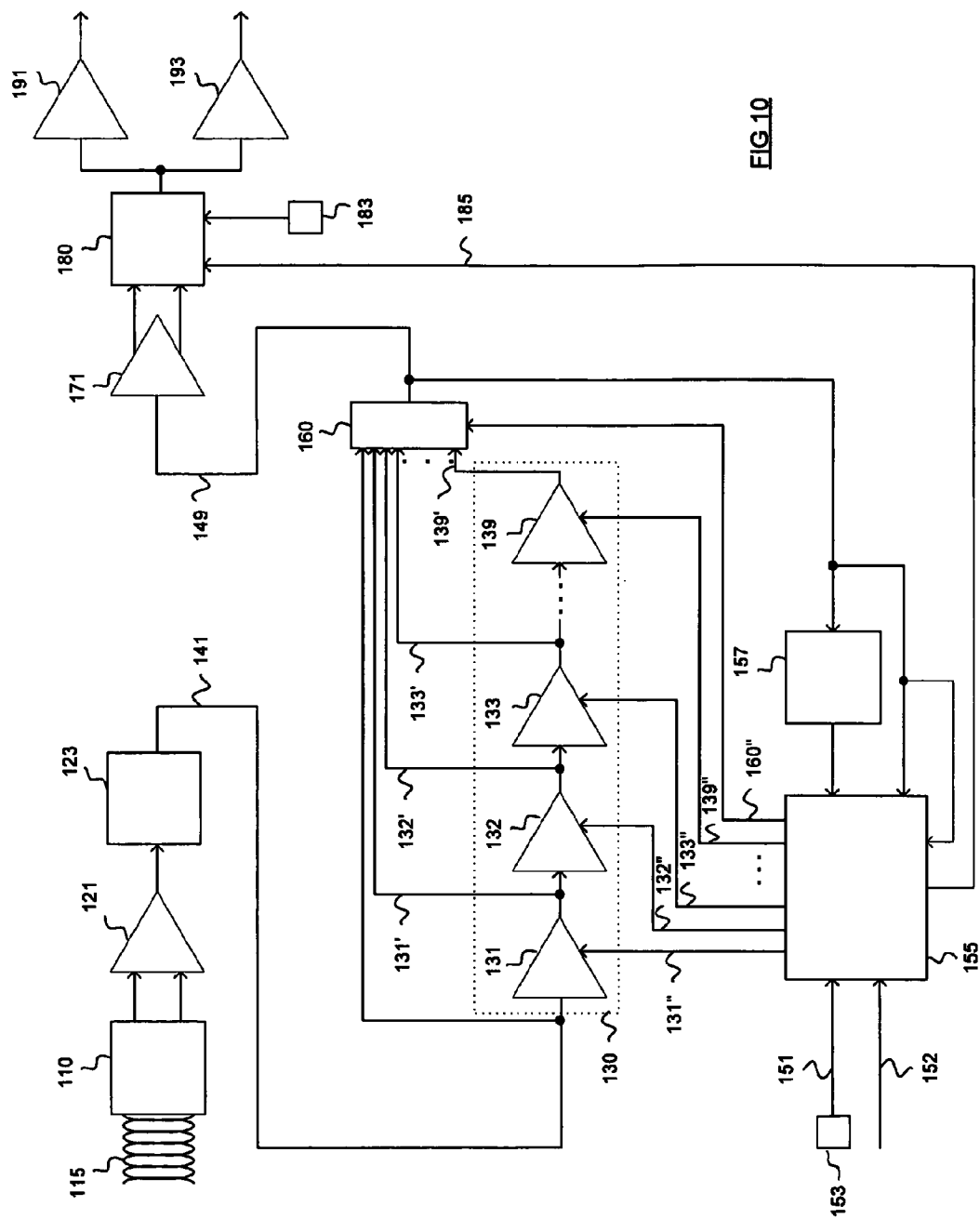
FIG. 10 is a block diagram of a system for receiving a composite video signal in accordance with embodiments of the present invention.

Referring now to the exemplary embodiment of FIG. 10, an adaptive equalizer circuit 180 can be configured to receive a single-ended mode amplified video signal 149 (or, as described above, a differential mode derivative thereof, through differential amplifier 171). Adaptive equalizer circuit 180 can be configured to further amplify the amplified video signal 149 with a maximum gain of T, where gain T corresponds to the maximum attenuation (and thus transmission line length) that adaptive equalizer 180 can compensate for alone. For example, adaptive equalizer 180 can be configured to provide a gain of 24 dB (corresponding to a maximum compensable UTP transmission line length of about 600 meters). In some implementations, the gain G of plurality of amplifiers 130 can be about equal to theoretical attenuation A minus gain T of adaptive equalizer circuit 180. For example, if the theoretical attenuation A of a 1800 meter UTP transmission line is 72 dB and adaptive equalizer circuit 180 can provide a gain of 24 dB, the gain G of plurality of amplifiers 130 can be equal to 72 dB (theoretical attenuation A) minus 24 dB (gain T), or 48 dB. In a further illustration, plurality of amplifiers 130 can include four amplifiers 131, 132, 133, and 139 each having a gain of 12 dB. Thus, the maximum gain of such an exemplary system includes the sum of 12 dB from each of amplifiers 131, 132, 133, and 139 and 24 dB from adaptive equalizer circuit 180 for a total of 72 dB.

From the above, it can be seen that, in some examples, plurality of amplifiers 130 can be configured to amplify video signal 141 such that amplified video signal 149 appears, to adaptive equalizer circuit 180, to have been transmitted on a 600 meter transmission line. Thus, according to one embodiment of the present invention, the maximum amplitude of amplified video signal 149 is within an operating range of an input of adaptive equalizer circuit 180. For example, adaptive equalizer circuit 180 may have a maximum input voltage of 2.4 volts peak-to-peak. Control unit 150 may be configured to cause video signal 141 to be amplified such that amplified video signal 149 has an amplitude not to exceed 2.4 volts peak-to-peak. In another example, amplified video signal 149 can have an amplitude not to exceed eighty percent of the maximum input voltage of adaptive equalizer circuit 180.

Referring back now to the exemplary embodiment of FIG. 6, and as described in detail above, an exemplary apparatus can include a control unit 50 for generating at least one configuration signal to plurality of amplifiers 30 and analog switch 60. Amplifiers 31, 32, 33, and 39 may be configured to enable or disable an output corresponding to the state of configuration signals 31", 32", 33", and 39", respectively. In addition, analog switch 60 may be configured to generate (corresponding to the state of configuration signal 60") amplified video signal 49 reflective of one of either video signal 41, or amplifier output signals 31', 32', 33', and 34'. Control unit 50 can be further configured to receive amplified video signal 49 from analog switch 60. In accordance with one or more aspects of the present invention, control unit 50 may be configured to generate the configuration signals in response to amplified video signal 49 and/or external inputs.

Figure 2A:
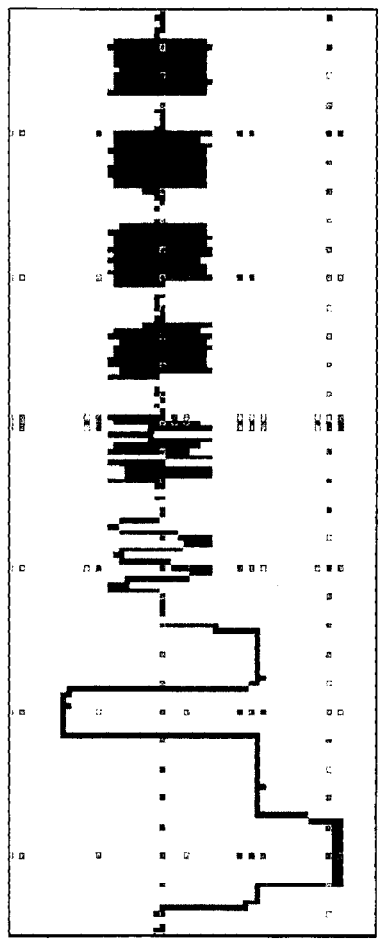
FIGS. 2A and 2B are exemplary waveforms representative of conventional black-and-white and color composite video signals, respectively.
Figure 2B:
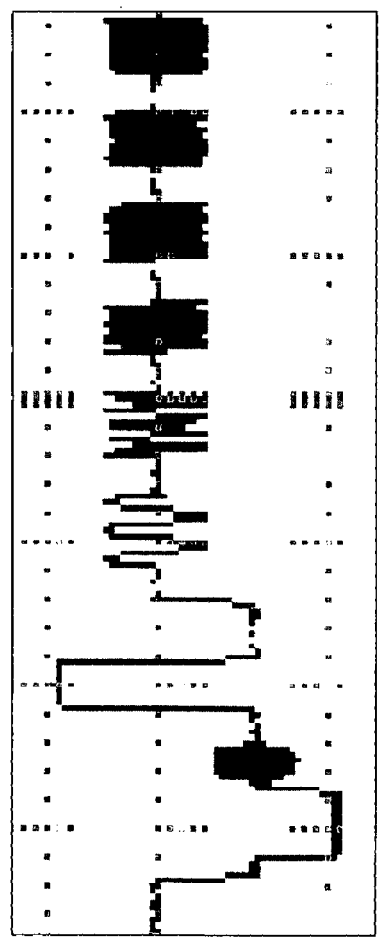
Figure 3:
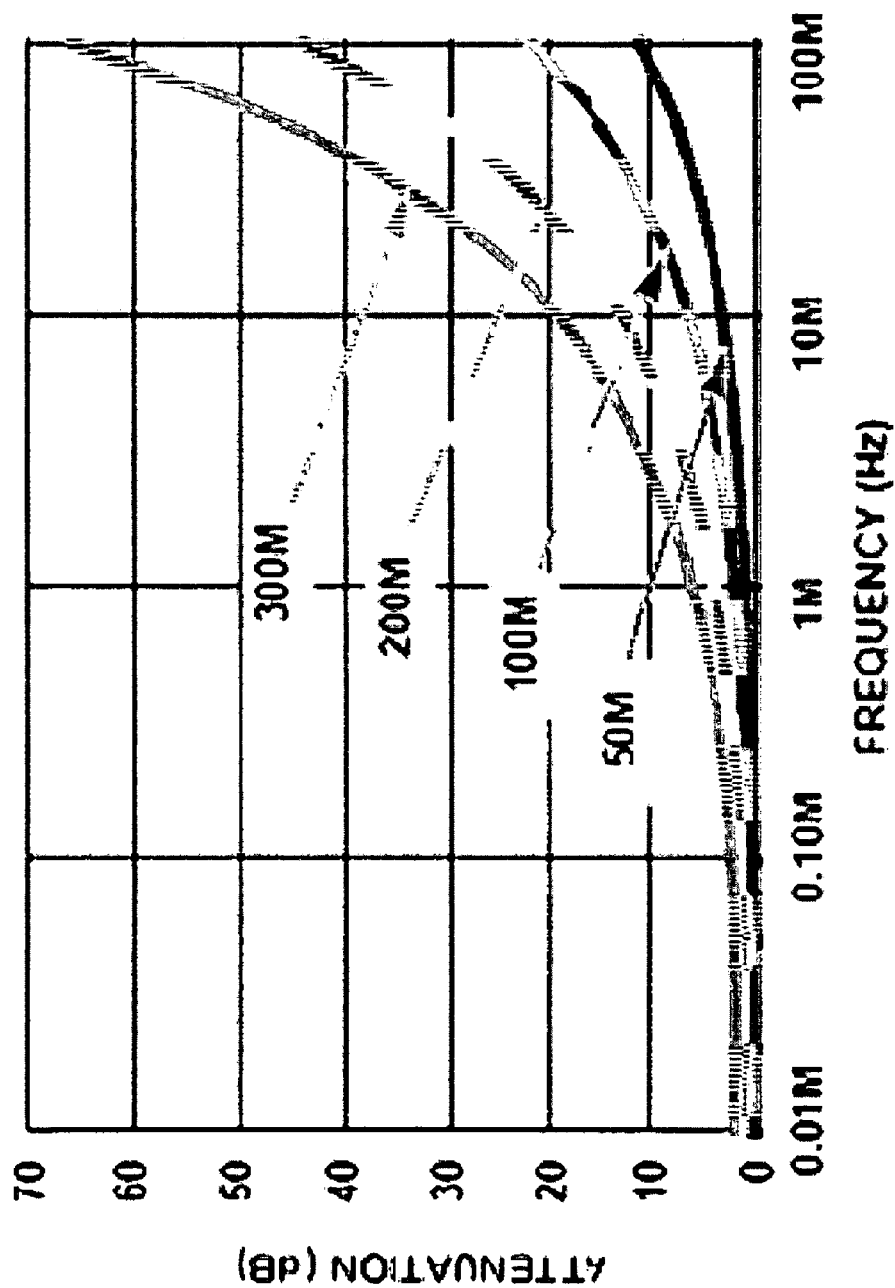
FIG. 3 is a chart depicting attenuation of a typical UTP transmission line versus frequency for 50, 100, 200, and 300 meter line lengths.
Figure 4A:
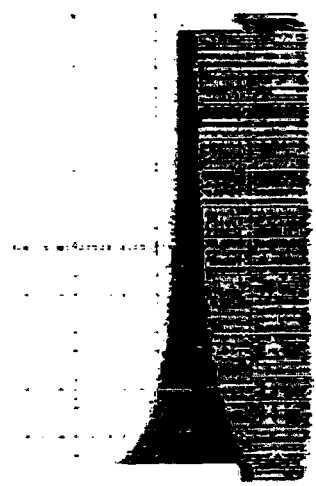
FIGS. 4A through 4D are exemplary waveforms representative of conventional composite video signals received from a UTP transmission line of 300, 600, 900, and 1200 meters, respectively.
Figure 4B:
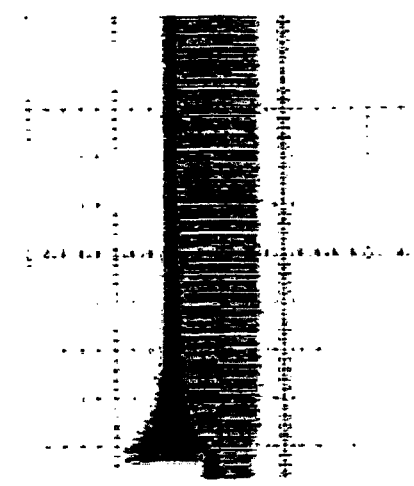
Figure 4C:
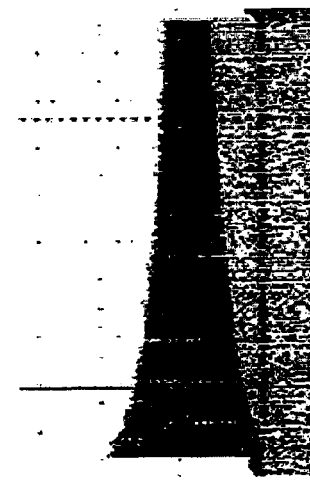
Figure 4D:
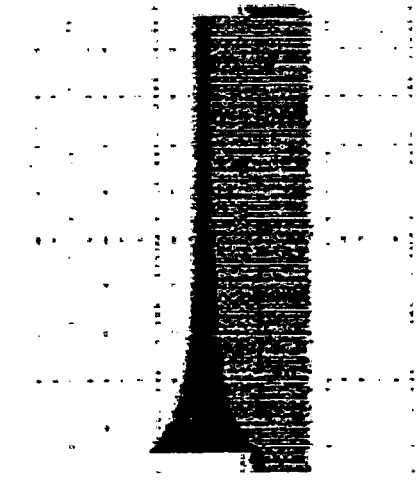

Embodiments of the present invention are capable of automatically changing the configuration signals in response to a color video signal. In some embodiments, amplified video signal 49 is a color video signal (e.g., has a color burst portion as seen in the illustration of FIG. 2B). In these embodiments, control unit 50 may be configured to measure a voltage amplitude of the sync, color burst, and back porch portions of amplified video signal 49. Because the color burst portion may be a sinusoidal signal of about 3.58 MHz and positioned at a fixed location within the composite video signal, it is well suited for use as a reference point in measuring the amount by which the composite video signal has been attenuated, if any, over the UTP transmission line. As is shown in FIG. 2B, and as is described more fully above, under ideal conditions the color burst has a peak-to-peak amplitude that is about equal to the amplitude of the sync portion. The sync portion and the back porch portion comprise primarily low frequency components and the color burst comprises primarily high frequency components. And as illustrated in the example of FIG. 3, for a given UTP transmission line length, the higher frequency components may experience greater attenuation than the lower frequency components. By comparing the respective amplitudes of the sync and/or back porch portion and the color burst portion, it can be determined whether compensation is required, and if so, to what extent.

Figure 9:
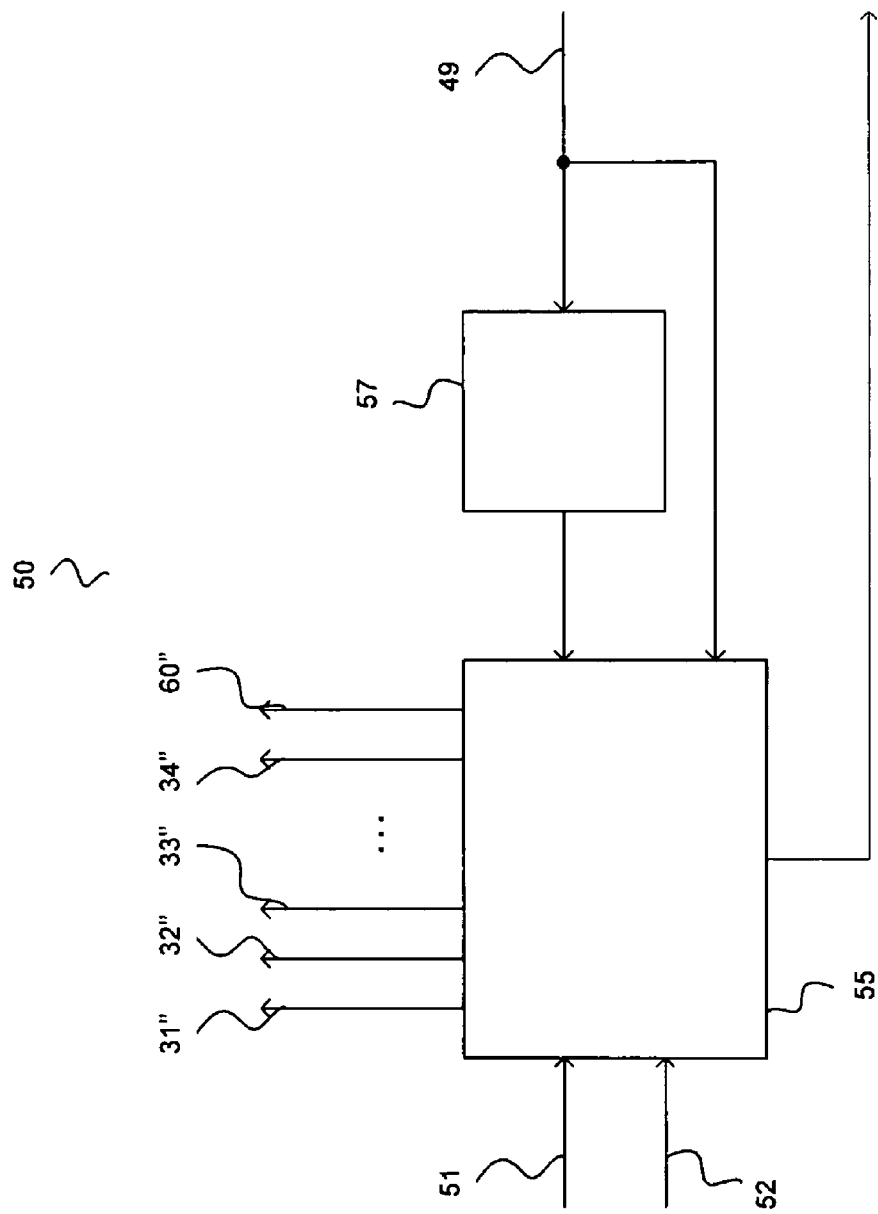
FIG. 9 is a block diagram of a control circuit in accordance with embodiments of the present invention.

In some implementations, and as shown in the example of FIG. 9, control unit 50 may include a logic element 55 and a sync separator 57. Sync separator 57 can be configured to receive amplified video signal 49 from analog switch 60 and generate timing information corresponding to the sync, color burst, and back porch portion of amplified video signal 49. Logic element 55 may be a microcontroller, microprocessor, or other logic suitable for receiving analog amplified video signal 49 and timing information from sync separator 57. In one example, logic 55 may be programmed to measure the amplitude of the sync tip and color burst portions of amplified video signal 49 at specific time intervals determined by sync separator 57. Based on the amplitude of the sync and color burst portions, logic 55 may configure plurality of amplifiers 30 and analog switch 60.

It is to be appreciated that in some cases automatic configuration may not be possible or desirable. For example, because control unit 50 may use the amplitude of the color burst portion of the composite signal to determine whether compensation is required, and because there is no color burst portion in black-and-white composite video signals, automatic configuration may not be possible. In such examples, it may be desirable to provide to control unit 50 one or more user selectable signals for manual configuration of the video amplification circuit 40.

In some embodiments, and as shown in the example of FIG. 10, control unit 150 may be configured to receive at least one user mode control signal 151 and generate configuration signals (e.g., configuration signals 131", 132", 133", 139", and 160") in response thereto. The user mode control signal 151 may comprise a multibit line having at least N+2 states where N corresponds to the number of amplifiers in the plurality of amplifiers. In some examples, plurality of amplifiers 130 may include four serially connected amplifiers. In that example, the user mode control signal 151 may have six states: one state corresponding to each of the amplifiers, one state corresponding to zero compensation mode, and one state for placing the system in automatic configuration mode. Control unit 150 may be configured to operate in "automatic" mode (e.g., measure the amplitude of the color burst) when user mode control signal 151 is in the "automatic" state. When user mode control signal 151 is not in the "automatic" state, control unit 150 may be configured to enable or disable the output of one or more amplifiers (and appropriately configure analog switch 160) directly from the state of user mode control signal 151.

In other implementations, user mode control signal 151 may be generated from a switch, a button, a potentiometer, or a jumper. For example, a rotary mechanical switch 153 may be provided to generate the user mode control signal 151. When switch 153 is in a first (and "automatic") state, control unit 150 may be configured to automatically compensate for transmission line losses by measuring the amplitude of the color burst. When in a second state, control unit 150 may be configured to disable the outputs of each of the plurality of amplifiers 130 (e.g., amplifiers 131, 132, 133, and 139) and configure analog switch 160 to generate an amplified video signal 149 reflective of video signal 141. In a third state, control unit 150 may be configured to enable an output of amplifier 131, disable an output of other amplifiers, and configure analog switch 160 to generate an amplified video signal 149 reflective of output signal 131' of amplifier 131. In operation, and in one example, a user may rotate mechanical switch 153 through the various positions while observing the video quality on a monitor or oscilloscope, and continue adjusting until the desired video quality is received.

In alternative implementations, control unit 150 may be configured to receive at least one digital mode control signal 152. Digital mode control signal 152 has a function similar to that of user mode control signal 151—mainly, to provide for manual configuration. However, digital mode control signal 152 may be generated by a supervisory processor, or, may be derived from an Ethernet device. In some examples, digital mode control signal 152 may be generated by a remote circuit, such as a surveillance camera control station. A user that is located in a different location may therefore be able to select either automatic or manual mode (and if manual mode, continue adjusting the state until the desired video quality is received).

In addition to user mode control signal 151 and or digital mode control signal 152, and in some embodiments including an adaptive equalizer circuit 180, an additional switch 183 may be provided for adjusting a response characteristic of adaptive equalizer circuit 180. As discussed above, conventional adaptive equalizer circuits 180 can compensate for transmission line losses of color composite signals by monitoring the sync pulse and color burst amplitudes. However, when video signal 141 comprises a black-and-white composite video signal, conventional adaptive equalizer circuits are not able to automatically compensate for losses.

In some examples, conventional adaptive equalizer circuits 180 can be coupled to a dip switch 183 for manually setting the desired gain. The manually configured gain may have different gain resolutions than does one or more of the plurality of amplifiers 130. In some embodiments of the invention, an adaptive equalizer control signal 185 may be generated by control unit 50. Adaptive equalizer control signal 185 may be derived from either user mode control signal 151 and or digital mode control signal 152. By providing a common interface, both the gain of plurality of amplifiers 130 and the gain of adaptive equalizer circuit 180 may be simultaneously configured by switch 153 or a digital device (through digital mode control signal 152)

An Exemplary System for Receiving a Composite Video Signal

In other embodiments, the invention concerns a system for receiving a composite video signal from an unshielded twisted pair transmission line. Referring to the exemplary embodiment of FIG. 10, the system can include a port configured to receive a signal from the unshielded twisted pair transmission line 115, the port comprising a terminal (not shown) and an electrostatic discharge protection and load line balancing circuit 110. A pre-processing circuit can be configured to receive a signal from the port, the pre-processing circuit comprising a preamplifier 121 and a DC restore circuit 123.

The system can also include a plurality of amplifiers 130. Each amplifier (e.g., amplifiers 131, 132, 133, and 139) can be configured to receive at least one configuration signal (e.g., configuration signals 131", 132", 133", and 139" corresponding to amplifiers 131, 132, 133, and 139, respectively). A first of the plurality of amplifiers 130 (for example, amplifier 131) can be configured to receive a signal 141 from the pre-processing circuit. An analog switch 160 may be provided and configured to receive (i) signal 141 from the pre-processing circuit, (ii) a signal from each of plurality of amplifiers 130, and (iii) at least one configuration signal 160". A control unit may be provided (which may include logic 155 and a sync separator 157), the control unit configured to (i) receive a signal 149 from the analog switch 160 and (ii) generate at least one configuration signal. In some implementations, plurality of amplifiers 130 can be configured to be enabled in response to the configuration signals (e.g., configuration signals 131", 132", 133", and 139"). Analog switch 160 may also be configured in response to a configuration signal (e.g., configuration signal 160").

In some implementations, a post-processing circuit can be included and configured to receive signal 149 from analog switch 160, the post-processing circuit comprising a differential amplifier 171. A video processing circuit 180 can be configured to receive a signal from the post-processing circuit (which as shown in the example of FIG. 10, includes differential amplifier 171). In some implementations, video processing circuit 180 can include an adaptive equalizer circuit. A video driver circuit (comprising video drivers 191 and 193) may be included in some implementations and configured to receive a signal from video processing circuit 180 and generate at least one signal capable of being received by one of the group consisting of an analog video recorder, a digital video recorder, an analog monitor, a digital monitor, and combinations thereof.

In some embodiments, plurality of amplifiers 130 may be configured to compensate for transmission line losses resulting from an unshielded twisted pair transmission line of at least length L. For example, it may be desired to receive a composite video signal a distance L from the location where the composite video signal is generated by, for example, a surveillance camera. The typical attenuation per meter length can be determined for a given UTP transmission line (for example, Cat 5 cabling). For example, the attenuation of Cat 5 cabling has been measured to be about 12 dB at 4 MHz per each 300 meters of transmission line length. Thus, in some examples, plurality of amplifiers 130 can be configured with a maximum gain equal to the maximum UTP transmission line run length divided by 300 meters times 12 dB.

In other embodiments, video processing circuit 180 may be configured to compensate for transmission line losses resulting from an unshielded twisted pair transmission line of at most length K. In some examples, video processing circuit 180 may be configured with a maximum gain of 24 dB, which corresponds to a maximum UTP transmission line run length of 600 meters. Since, however, both video processing circuit 180 and plurality of amplifiers 130 can both be configured to compensate for a portion of the transmission line losses, plurality of amplifiers 130 need not be configured to compensate for the maximum run length L. Accordingly, in other embodiments, plurality of amplifiers 130 can be configured to compensate for transmission line losses resulting from an unshielded twisted pair transmission line of at least length L minus length K. For example, in some implementations the maximum run length L can be 1800 meters and video processing circuit 180 can compensate for a run length of up to 600 meters. In those implementations, plurality of amplifiers 130 need only be configured to compensate for transmission line length of up to 1200 meters (e.g., the plurality of amplifiers 130 can comprise three serially connected amplifiers 131, 132, and 133, each configured with a gain of 12 dB).

An Exemplary Method of Amplifying a Video Signal

In other embodiments, methods of amplifying a composite video signal can include: causing the video signal to be received by an analog switch and a first of a plurality of N serially connected amplifiers; causing an output signal from each of the plurality of amplifiers to be received by the analog switch; causing an amplified video signal of the analog switch to be received by a control unit; causing a configuration signal from the control unit to be received by (i) the analog switch and (ii) each of the plurality of amplifiers, the configuration signal having at least N+1 states; and adjusting the state of the configuration signal in response to an amplitude of said amplified video signal.

For example, the configuration signal may be adjusted corresponding to the difference between the amplitudes of the sync and color burst portions of the composite video signal. In some examples, the configuration signal can be adjusted so as to increase the gain of the composite video signal through the plurality of amplifiers and the analog switch when the peak-to-peak amplitude of the color burst is less than the amplitude of the sync. In other examples, the configuration signal can be adjusted so as to decrease the gain of the composite video signal through the plurality of amplifiers and the analog switch when the peak-to-peak amplitude of the color burst is greater than the amplitude of the sync.

In some embodiments, the step of adjusting the state of the configuration signal can include: first, causing the state of the configuration signal to be in a first state; next, measuring an amplitude of at least one of the group consisting of a sync, color burst, and back porch portion of the amplified video signal; and then causing the state of the configuration signal to transition to the next higher state if the measured amplitude is about less than a first threshold value. For example, and without limitation, the configuration signal may start in a first state corresponding to a gain of zero (e.g., the output of each of the plurality of serially connected amplifiers is disabled and the analog switch is configured to pass the composite video signal). When the measured amplitude of the color burst is less than a first threshold value (for example, 3 dB), the configuration signal may transition to the next higher state. In some implementations, the next higher state corresponds to a gain greater than that of the first state. Continuing with the proceeding example, the configuration signal of the next higher state enables the output of the first of the plurality of serially connected amplifiers and configures the analog switch to pass the output signal of the first amplifier. The step of measuring and transitioning the configuration signal to the next higher state can continue until the configuration signal is in the absolute highest state.

In other embodiments, the methods can include the step of causing the state of the configuration to transition to the next lower state if the measured amplitude is about less than a second threshold. This step provides for a reduction in gain by disabling the last enabled amplifier of the plurality of serially connected amplifiers and causing the analog switch to pass the output signal of the proceeding amplifier. In some examples, the configuration signal may transition to the next lower state when the amplitude of the color burst is greater than a second threshold value (for example, 9 dB). It is to be appreciated that the first and second threshold values may be different to provide for a stable feedback control system (e.g., to include hysteresis in the control system). In some implementation, and continuing with the proceeding examples, the first and second threshold values may be separated by 6 dB.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An apparatus for amplifying a video signal, comprising:
    a. a plurality of amplifiers each configured to receive at least one configuration signal, wherein a first of said plurality of amplifiers is further configured to receive said video signal;
    b. an analog switch configured to (i) receive said video signal, a signal from each of said plurality of amplifiers, and said at least one configuration signal and (ii) generate an amplified video signal; and
    c. a control unit configured to (i) receive said amplified video signal and (ii) generate said at least one configuration signal, wherein said plurality of amplifiers are configured to be enabled in response to said at least one configuration signal and said analog switch is configured in response to said at least one configuration signal.

2. The apparatus of claim 1, further comprising a pre-processing circuit configured to receive a signal from a differential transmission line and generate said video signal, said pre-processing circuit comprising a preamplifier and a DC restore circuit.

3. The apparatus of claim 2, further comprising a post-processing circuit configured to receive said amplified video signal and generate a differential amplified video signal, said post-processing circuit comprising a differential amplifier.

4. The apparatus of claim 1, wherein each of said plurality of amplifiers have a response characteristic about equal to each other.

5. The apparatus of claim 1, wherein a response characteristic of each of said plurality of amplifiers are configured by said control unit.

6. The apparatus of claim 1, wherein said apparatus is configured to compensate for transmission line losses resulting in attenuation A and said plurality of amplifiers is configured to amplify said video signal with a gain of at least G.

7. The apparatus of claim 6, wherein G is about equal to A.

8. The apparatus of claim 6, further comprising an adaptive equalizer circuit configured to receive said amplified video signal.

9. The apparatus of claim 8, wherein said adaptive equalizer circuit is configured to amplify said video signal with a maximum gain of T and wherein G is about equal to A minus T.

10. The apparatus of claim 8, wherein the maximum amplitude of said amplified video signal is within an operating range of an input of said adaptive equalizer circuit.

11. The apparatus of claim 1, wherein said plurality of amplifiers are configured in series.

12. The apparatus of claim 1, wherein at least two of said plurality of amplifiers are configured in parallel.

13. The apparatus of claim 1, wherein said control unit is further configured to generate said at least one configuration signal in response to at least one user mode control signal received from the group consisting of a switch, a button, a potentiometer, and a jumper.

14. The apparatus of claim 1, wherein said control unit is further configured to generate said at least one configuration signal in response to at least one digital mode control signal received from a digital device.

15. The apparatus of claim 1, wherein said amplified video signal comprises a color video signal, and said control unit is further configured to generate said at least one configuration signal in response to the amplitude of at least one of the group consisting of a sync, color burst, and back porch portion of said amplified video signal.

16. The apparatus of claim 15, wherein said control unit comprises a sync separator configured to receive said amplified video signal and generate timing information corresponding to at least one of said sync, said color burst, and said back porch portion of said amplified video signal.

17. An apparatus for amplifying a video signal comprising:
    a. a pre-processing circuit configured to receive a signal from a differential transmission line and generate said video signal, said pre-processing circuit comprising a preamplifier and a DC restore circuit;
b. a plurality of amplifiers configured in series, each configured to receive at least one configuration signal, wherein a first of said plurality of amplifiers is further configured to receive said video signal;
c. an analog switch configured to (i) receive said video signal, a signal from each of said plurality of amplifiers, and said at least one configuration signal and (ii) generate an amplified video signal;
d. at least one user mode control signal received from the group consisting of a switch, a button, a potentiometer, and a jumper;
e. a control unit comprising a sync separator and configured to (i) receive said amplified video signal and said at least one user mode control signal and (ii) generate said at least one configuration signal in response to the amplitude of a color burst portion of said amplified video signal and said at least one user mode control signal, wherein said plurality of amplifiers are configured to be enabled in response to said at least one configuration signal and said analog switch is configured in response to said at least one configuration signal; and
f. a post-processing circuit configured to receive said amplified video signal and generate a differential amplified video signal, said post-processing circuit comprising a differential amplifier.

18. A system for receiving a composite video signal from an unshielded twisted pair transmission line comprising:
a. a port configured to receive a signal from said unshielded twisted pair transmission line, said port comprising a terminal, an electrostatic discharge protection circuit, and a load line balancing circuit;
b. a pre-processing circuit configured to receive a signal from said port, said pre-processing circuit comprising a preamplifier and a DC restore circuit;
c. a plurality of amplifiers each configured to receive at least one configuration signal, wherein a first of said plurality of amplifiers is further configured to receive a signal from said pre-processing circuit;
d. an analog switch configured to receive (i) a signal from said pre-processing circuit, (ii) a signal from each of said plurality of amplifiers, and (iii) said at least one configuration signal;
e. a control unit configured to (i) receive a signal from said analog switch and (ii) generate said at least one configuration signal, wherein said plurality of amplifiers are configured to be enabled in response to said at least one configuration signal and said analog switch is configured in response to said at least one configuration signal;
f. a post-processing circuit configured to receive a signal from said analog switch, said post-processing circuit comprising a differential amplifier;
g. a video processing circuit configured to receive a signal from said post-processing circuit; and
h. a video driver circuit configured to receive a signal from said video processing circuit and generate at least one signal capable of being received by one of the group consisting of an analog video recorder, a digital video recorder, an analog monitor, a digital monitor, and combinations thereof.

19. The system of claim 18, wherein said plurality of amplifiers are configured to compensate for transmission line losses resulting from an unshielded twisted pair transmission line of at least length L.

20. The system of claim 18, wherein said video processing circuit is further configured to compensate for transmission line losses resulting from an unshielded twisted pair transmission line of at most length K.

21. The system of claim 20, wherein said plurality of amplifiers are configured to compensate for transmission line losses resulting from an unshielded twisted pair transmission line of at least length L minus length K.

22. A method of amplifying a composite video signal, comprising:
a. causing said video signal to be received by an analog switch and a first of a plurality of N serially connected amplifiers;
b. causing an output signal from each of said plurality of amplifiers to be received by said analog switch;
c. causing an amplified video signal of said analog switch to be received by a control unit;
d. causing a configuration signal from said control unit to be received by (i) said analog switch and (ii) each of said plurality of amplifiers, said configuration signal having at least N+1 states; and
e. adjusting the state of said configuration signal in response to an amplitude of said amplified video signal.

23. The method of claim 22, said step of adjusting the state of said configuration signal comprising:
a. first, causing the state of said configuration signal to be in a first state;
b. next, measuring an amplitude of at least one of the group consisting of a sync, color burst, and back porch portion of said amplified video signal; and
c. then causing said state of said configuration signal to transition to the next higher state if said measured amplitude is about less than a first threshold value.

24. The method of claim 23, wherein said step of transitioning said configuration signal to the next higher state comprises configuring said plurality of amplifiers to have a gain greater than that corresponding to said first state.

25. The method of claim 23, further comprising causing the state of said configuration to transition to the next lower state if said measured amplitude is about greater than a second threshold.

26. The method of claim 25, wherein said step of transitioning said configuration signal to the next lower state comprises configuring said plurality of amplifiers to have a gain lower than that corresponding to said first state.

27. The method of claim 25, wherein said first threshold and said second threshold are separated by about 6 dB.

* * * * *